United States Patent
Feng et al.

(10) Patent No.: US 8,343,586 B2
(45) Date of Patent: Jan. 1, 2013

(54) CONDUCTIVE POLISHING PAD AND METHOD FOR MAKING THE SAME

(75) Inventors: Chung-Chih Feng, Kaohsiung (TW);
I-Peng Yao, Kaohsiung (TW);
Yung-Chang Hung, Kaohsiung (TW);
Chun-Ta Wang, Kaohsiung (TW)

(73) Assignee: Bestac Advanced Material Co., Ltd., Taoyuan County (TW)

( * ) Notice: Subject to any disclaimer, the term of this patent is extended or adjusted under 35 U.S.C. 154(b) by 529 days.

(21) Appl. No.: 12/427,259

(22) Filed: Apr. 21, 2009

(65) Prior Publication Data
US 2010/0119811 A1    May 13, 2010

(30) Foreign Application Priority Data
Nov. 12, 2008  (TW) ................................ 97143727 A

(51) Int. Cl.
*B05D 1/36*  (2006.01)
*B05D 7/00*  (2006.01)

(52) U.S. Cl. ............ 427/404; 427/243; 427/407.1; 427/412; 427/430.1; 51/295; 51/298; 451/908

(58) Field of Classification Search ............ 427/407.1, 427/412, 404; 451/64, 56, 548, 420
See application file for complete search history.

(56) References Cited

U.S. PATENT DOCUMENTS

| | | | | |
|---|---|---|---|---|
| 6,136,043 | A  * | 10/2000 | Robinson et al. | 8/485 |
| 7,226,345 | B1 * | 6/2007  | Dornfeld et al. | 451/285 |
| 2002/0004357 | A1 * | 1/2002 | Baker et al. | 451/41 |
| 2004/0023610 | A1 * | 2/2004 | Hu et al. | 451/526 |
| 2004/0159558 | A1 * | 8/2004 | Bunyan et al. | 205/684 |
| 2004/0259484 | A1 | 12/2004 | Prasad et al. | |
| 2005/0107007 | A1 * | 5/2005 | Furukawa et al. | 451/41 |
| 2005/0215177 | A1 | 9/2005 | Prasad | |

(Continued)

FOREIGN PATENT DOCUMENTS

TW   591065   6/2004

(Continued)

OTHER PUBLICATIONS

Joel et al., Isocyanate reactions in and with N,N-dimethylformamide; Die Angewandte Makromolekulare Chemie; 197 (1992) 131-139.*
Lee et al.; Development of a CMP Pad with Controlled Micro Features for Improved Performance; Semiconductor Manufacturing, ISSM 2005, IEEE International Symposium; pp. 173-176; Sep. 2005.*

(Continued)

*Primary Examiner* — Timothy Meeks
*Assistant Examiner* — Michael P Rodriguez
(74) *Attorney, Agent, or Firm* — WPAT, P.C.; Anthony King

(57) ABSTRACT

The present invention relates to a conductive polishing pad and a method for making the same. The conductive polishing pad includes a bottom layer, a conductive film and a polishing layer. The bottom layer includes a first high polymer and a fiber base. The first high polymer covers the fiber base, and has a plurality of first holes. The conductive film is disposed on the bottom layer. The polishing layer is disposed on the conductive film, and includes a second high polymer. The second high polymer has a plurality of second holes. Even though the bottom layer and the polishing layer are poor conductors, the conductivity thereof is raised by the conductive film, so that the polishing pad has good conductivity. Further, the polishing pad has a flexible surface, which prevents a surface of a workpiece to be polished from being scratched during polishing.

3 Claims, 6 Drawing Sheets

U.S. PATENT DOCUMENTS

| | | |
|---|---|---|
| 2005/0274627 A1 | 12/2005 | Wylie et al. |
| 2006/0089093 A1* | 4/2006 | Swisher et al. ............... 451/526 |
| 2007/0010175 A1* | 1/2007 | Feng et al. ..................... 451/41 |
| 2007/0235904 A1* | 10/2007 | Saikin ........................... 264/497 |

FOREIGN PATENT DOCUMENTS

| | | |
|---|---|---|
| TW | 200505632 | 2/2005 |
| TW | I 279287 | 4/2007 |
| TW | I 280266 | 5/2007 |
| TW | I 295949 | 4/2008 |

OTHER PUBLICATIONS

English Abstract of TW591065.
English Abstract of TW200505632.
Office action and Search Report issued May 18, 2012 to the corresponding TW Patent Application No. 097143727 cites TW I279287 (corresponding to US20050274627), TW I295949 (corresponding to US20040259484), TW I280266 (corresponding to US20050215177).
English abstract summary of the TW office action 097143727, citing TW I279287, I295949, and I280266.

\* cited by examiner

CONDUCTIVE POLISHING PAD AND METHOD FOR MAKING THE SAME

BACKGROUND OF THE INVENTION

1. Field of the Invention

The present invention relates to a polishing pad and a method for making the same, and more particularly to a conductive polishing pad and a method for making the same.

2. Description of the Related Art

FIG. 1 shows a schematic view of an application of a conventional conductive polishing pad disclosed in Taiwan (R.O.C.) Patent Publication No. 200505632. The conductive polishing pad 1 comprises a bottom layer 11 and a polishing layer 12. The bottom layer 11 has a circuit 111. The polishing layer 12 has a polishing surface 121, and the polishing surface 121 has at least one anode 122 and at least one cathode 123. The anode 122 and the cathode 123 are connected to a positive terminal 221 and a negative terminal 222 of a power outlet 22 respectively by the circuit 111 and an electrical connector 21.

During polishing, the conductive polishing pad 1 is fixed on a polishing disc 23, and a substrate 24 is fixed on a substrate carrier 25. The substrate 24 has a metal layer 241, and is disposed over the polishing surface 121. A slurry 26 is disposed between the substrate 24 and the polishing surface 121. When the power outlet 22 is on, and the slurry 26, the anode 122, the cathode 123 and the metal layer 241 of the substrate 24 contact one another, a short circuit is formed. First, the charge of the metal atoms of the metal layer 241 is transferred, and metal ions are formed ($M \rightarrow M^+ + e^-$) and gather on the surface of the substrate 24. Afterward, an acceptor (complexing agent in the slurry 26) is diffused to the surface of the metal layer 241, and complexes are formed between the acceptor and the metal ions. Finally, the complexes are diffused from the surface of the metal layer 241 into the slurry 26. The diffusion rates of the complexes on the protrusion and the concavity on the surface of the substrate 24 are different. The complexes diffuse faster on the protrusion than on the concavity, and thus, a smooth surface on substrate 24 is formed.

The conventional conductive polishing pad 1 has the following disadvantages. The material of the anode 122 and the cathode 123 is metal with high hardness, so the surface of the substrate 24 will be scratched easily during polishing. Moreover, the anode 122 and the cathode 123 are worn after electrochemical mechanical polishing, and thus, the polishing surface 121 becomes rough, and the yield rate is reduced.

Therefore, it is necessary to provide a conductive polishing pad and a method for making the same to solve the above problems.

SUMMARY OF THE INVENTION

The present invention is directed to a conductive polishing pad. The conductive polishing pad comprises a bottom layer, a conductive film and a polishing layer. The bottom layer comprises a first high polymer and a fiber base. The first high polymer covers the fiber base, and has a plurality of first holes. The conductive film is disposed on the bottom layer. The polishing layer is disposed on the conductive film, and comprises a second high polymer. The second high polymer has a plurality of second holes.

The present invention is further directed to a method for making a conductive polishing pad. The method comprises the following steps: (a) providing a fiber base; (b) dipping the fiber base in a first high polymer solution, so that the fiber base is covered by the first high polymer solution, the first high polymer solution comprising a first high polymer and a first solvent; (c) solidifying the first high polymer solution, so as to form a bottom layer, wherein the bottom layer has a plurality of first holes; (d) forming a conductive film on the bottom layer; (e) forming a second high polymer solution on the conductive film, wherein the second high polymer solution comprises a second high polymer and a second solvent; and (f) solidifying the second high polymer solution, so as to form a polishing layer, wherein the polishing layer has a plurality of second holes.

The present invention is further directed to a conductive polishing pad. The conductive polishing pad comprises a conductive film, a bottom layer and a polishing layer. The bottom layer is disposed on the conductive film, and comprises a first high polymer and a fiber base. The first high polymer covers the fiber base, and has a plurality of first holes. The polishing layer is disposed on the bottom layer, and comprises a second high polymer. The second high polymer has a plurality of second holes.

The present invention is further directed to a method for making a conductive polishing pad. The method comprises the following steps: (a) providing a fiber base; (b) dipping the fiber base in a first high polymer solution, so that the fiber base is covered by the first high polymer solution, the first high polymer solution comprising a first high polymer and a first solvent; (c) forming a second high polymer solution on the first high polymer solution, wherein the second high polymer solution comprises a second high polymer and a second solvent; (d) solidifying the first high polymer solution and the second high polymer solution simultaneously, so as to form a bottom layer and a polishing layer respectively, wherein the bottom layer has a plurality of first holes, and the polishing layer has a plurality of second holes; and (e) forming a conductive film on the bottom layer.

Even though the bottom layer and the polishing layer are poor conductors, the conductivity thereof is raised by the conductive film, so that the polishing pad has good conductivity. Further, the polishing pad has a flexible surface, which prevents a surface of a workpiece to be polished from being scratched during polishing. Moreover, the polishing pad doesn't have electrodes, and the polishing surface of the polishing pad is a uniform material, which prevents materials with different hardness from being worn at different degrees after polishing, and prevents the polishing surface from becoming rough. Thus the yield rate is raised.

DETAILED DESCRIPTION OF THE INVENTION

Figure 1:
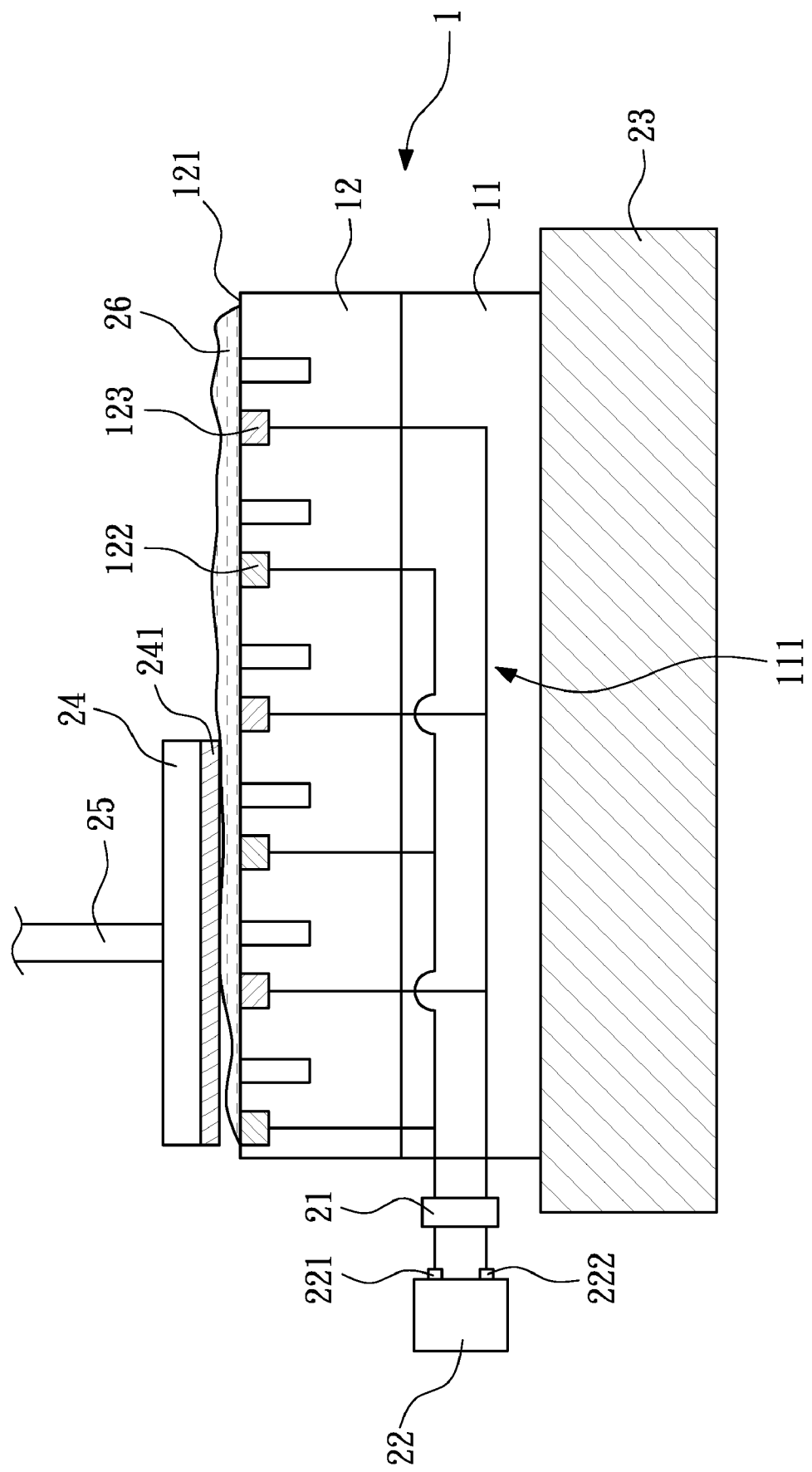
FIG. 1 is a schematic view of an application of a conventional conductive polishing pad.
Figure 2:
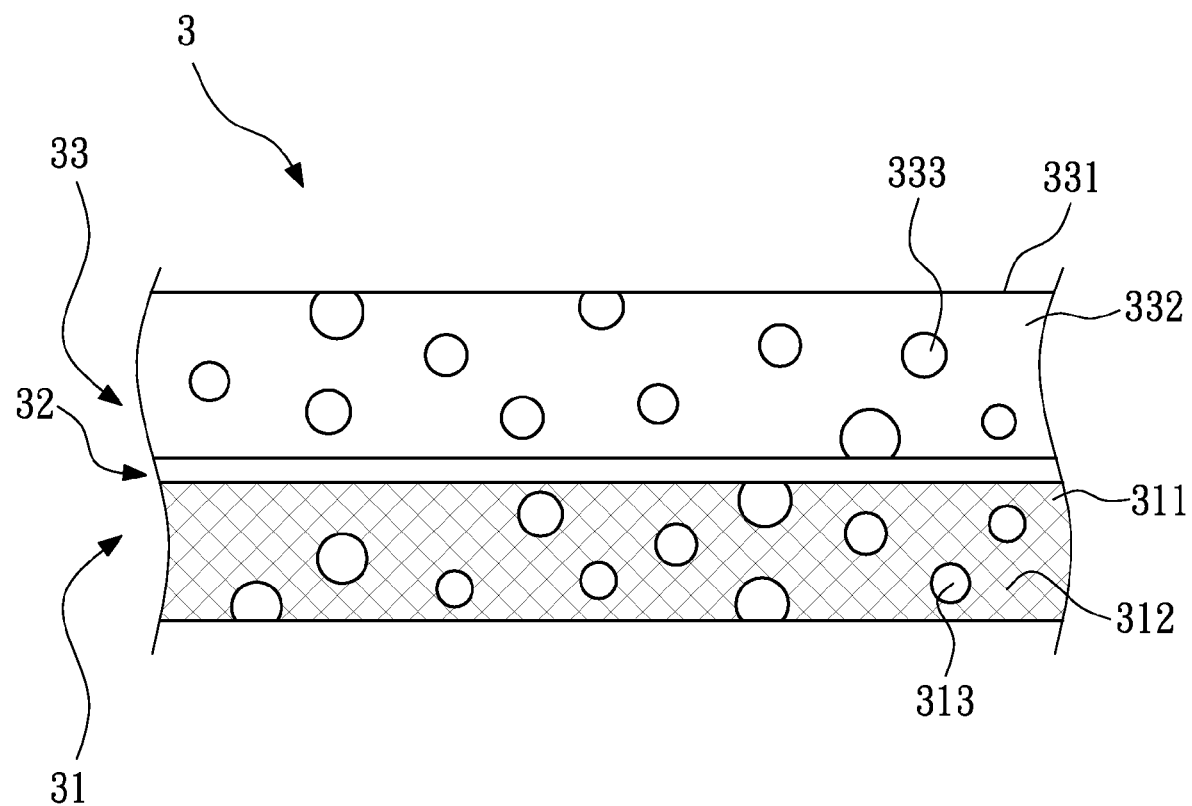
FIG. 2 is a schematic view of a conductive polishing pad according to a first embodiment of the present invention.

FIG. 2 shows a schematic view of a conductive polishing pad according to a first embodiment of the present invention.

The conductive polishing pad 3 comprises a bottom layer 31, a conductive film 32 and a polishing layer 33.

The bottom layer 31 comprises a first high polymer 311 and a fiber base 312. The first high polymer 311 covers the fiber base 312, and has a plurality of first holes 313. In the embodiment, the material of the first high polymer 311 is polypropylene (PP), polyethylene terephthalate (PET), polyurethane (PU) or polymeric resin, and the fiber base 312 is a non-woven fabric.

The conductive film 32 (model number: QF400, produced by QUAN YI ELECTRONICS CORP.) is disposed on the bottom layer 31. The polishing layer 33 is disposed on the conductive film 32, and has a polishing surface 331. The polishing layer 33 comprises a second high polymer 332. The second high polymer 332 has a plurality of second holes 333. In the embodiment, the material of the second high polymer 332 is polypropylene (PP), polyethylene terephthalate (PET), polyurethane (PU) or polymeric resin.

In other applications, the conductive polishing pad 3 further comprises a reinforced material (not shown). The reinforced material is disposed in the first holes 313 of the first high polymer 311 and the surface of the bottom layer 31. The reinforced material is hydrophilic polyurethane, hydrophilic acrylic resin, a water-proofing agent or a softening agent. The hydrophilic polyurethane and the hydrophilic acrylic resin are used to strengthen the bottom layer 31, the water-proofing agent is used to increase water-proofing ability, and the softening agent is used to increase softness. Preferably, the surface resistance of the conductive polishing pad 3 is less than $1\times10^5\Omega$, and the volume resistance of the conductive polishing pad 3 is less than $1\times10^6$ $\Omega\cdot$cm.

Figure 3:
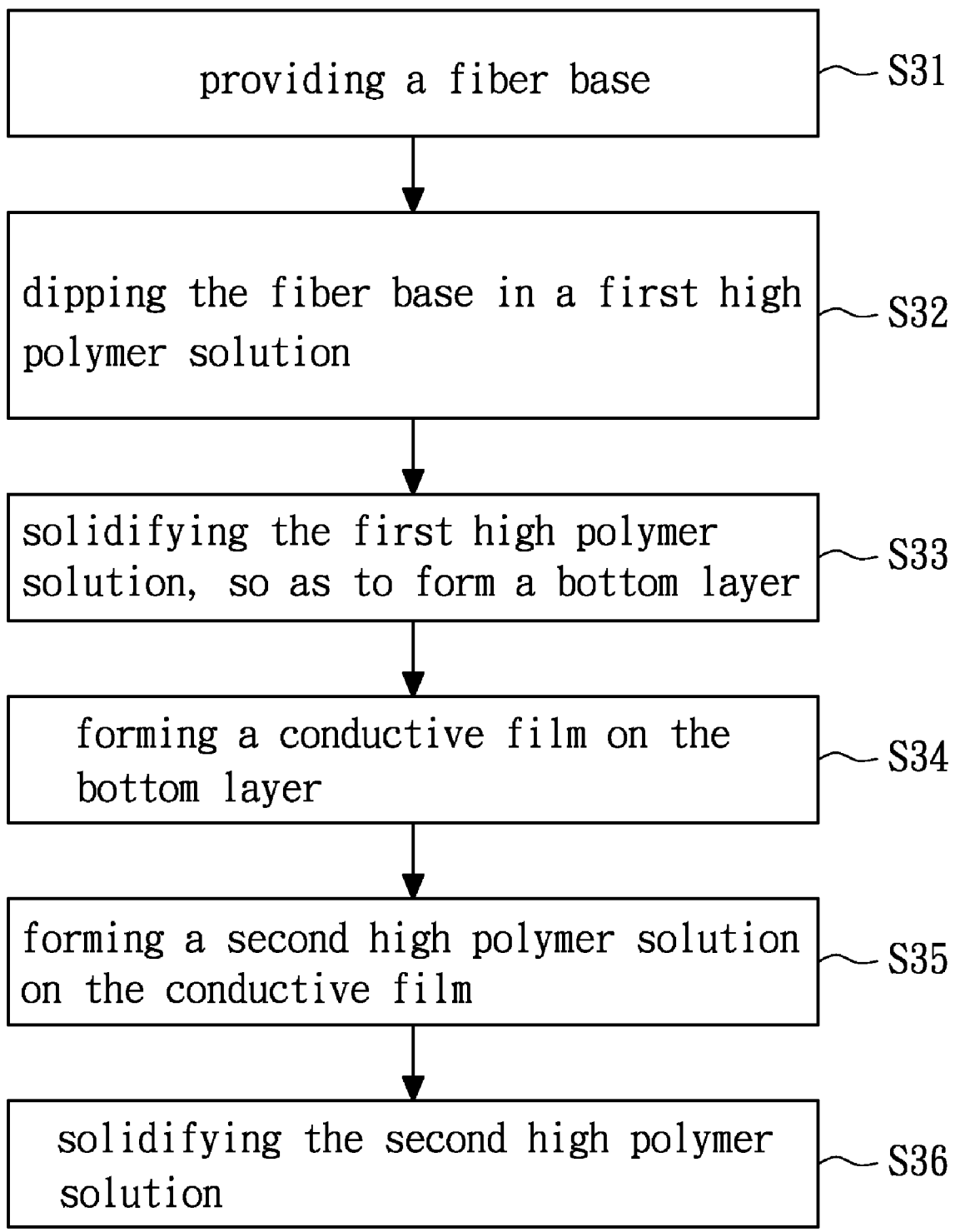
FIG. 3 is a flow chart of a method for making the conductive polishing pad according to the first embodiment of the present invention.

FIG. 3 shows a flow chart of a method for making the conductive polishing pad according to the first embodiment of the present invention. Referring to FIGS. 2 and 3, first, as shown in Step S31, a fiber base 312 is provided. In the embodiment, the fiber base 312 is a non-woven fabric. As shown in Step S32, the fiber base 312 is dipped in a first high polymer solution (not shown), so that the fiber base 312 is covered by the first high polymer solution. The first high polymer solution comprises a first high polymer 311 and a first solvent. In the embodiment, the material of the first high polymer 311 is polypropylene (PP), polyethylene terephthalate (PET), polyurethane (PU) or polymeric resin. Preferably, the first high polymer solution further comprises dye, surfactant and dimethylformamide (DMF).

As shown in Step S33, the first high polymer solution is solidified, so as to form a bottom layer 31, and the bottom layer 31 has a plurality of first holes 313. In other applications, the method further comprises a step of forming a reinforced material (not shown) in the first holes 313 and the surface of the bottom layer 31 after Step S33. The reinforced material is hydrophilic polyurethane, hydrophilic acrylic resin, a water-proofing agent or a softening agent, and the reinforced material is formed by dipping.

As shown in Step S34, a conductive film 32 (model number: QF400, produced by QUAN YI ELECTRONICS CORP.) is formed on the bottom layer 31. As shown in Step S35, a second high polymer solution (not shown) is formed on the conductive film 32, and the second high polymer solution comprises a second high polymer 332 and a second solvent. In the embodiment, the material of the second high polymer 332 is polypropylene (PP), polyethylene terephthalate (PET), polyurethane (PU) or polymeric resin. Preferably, the second high polymer solution further comprises dye, surfactant and dimethylformamide (DMF). Finally, as shown in Step S36, the second high polymer solution is solidified, so as to form a polishing layer 33, and the polishing layer 33 has a plurality of second holes 333 and a polishing surface 331.

Figure 4:
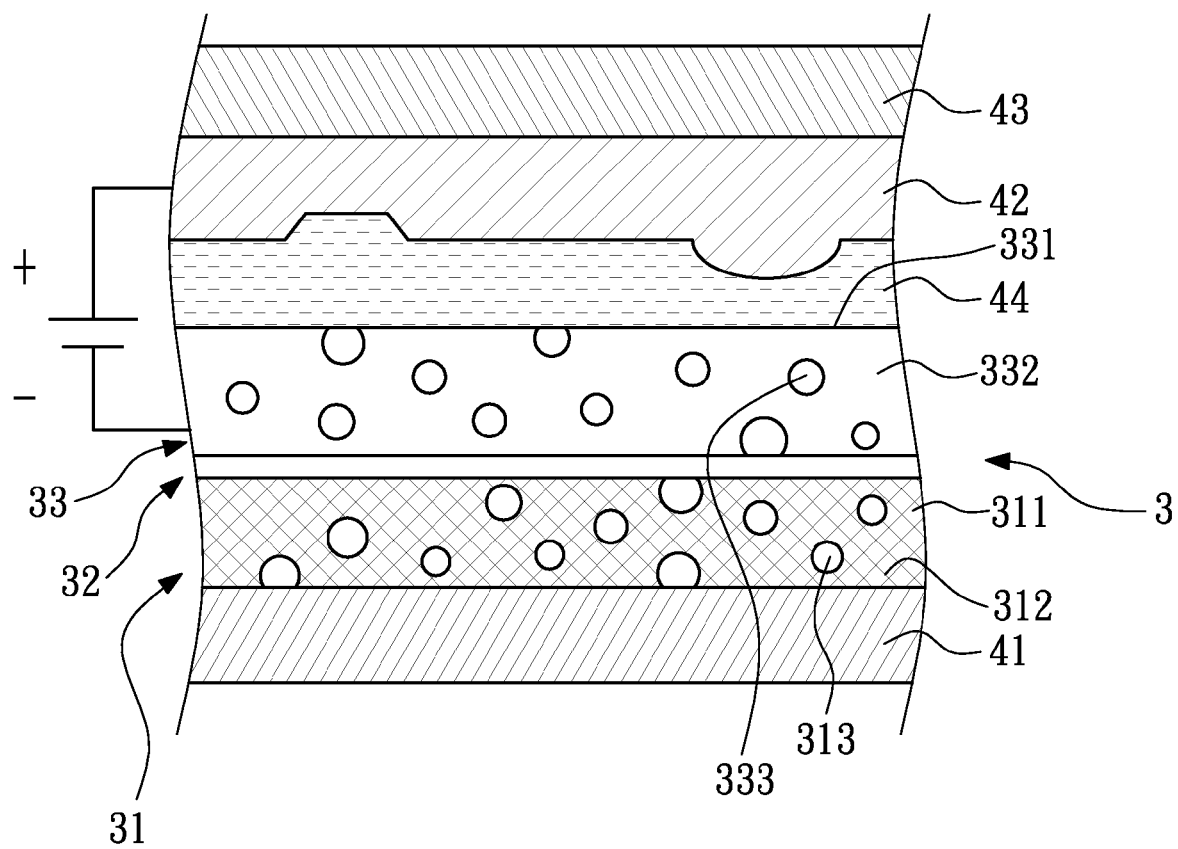
FIG. 4 is a schematic view of an application of the conductive polishing pad according to the first embodiment of the present invention.

FIG. 4 shows a schematic view of an application of the conductive polishing pad according to the first embodiment of the present invention. During polishing, the conductive polishing pad 3 is fixed on a polishing disc 41, and a workpiece to be polished (substrate 42) is fixed on a substrate carrier 43. The substrate 42 is disposed over the polishing pad 3. A slurry 44 is disposed between the substrate 42 and the polishing pad 3. Afterward, the substrate 42 is connected to the anode of a power outlet, and the polishing pad 3 is connected to the cathode of the power outlet. When the substrate 42, the slurry 44 and the polishing pad 3 contact one another, a circuit is formed and electro-chemical mechanical polishing commences.

Figure 5:
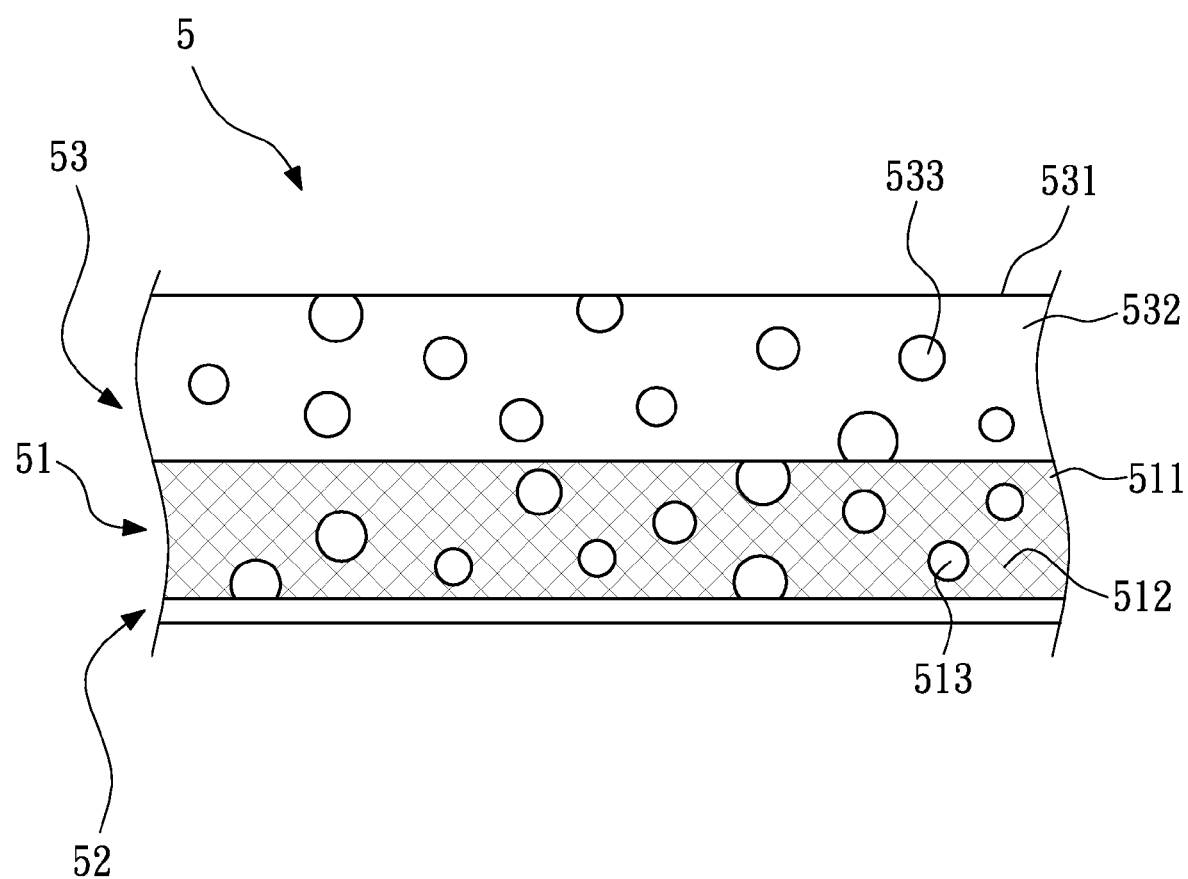
FIG. 5 is a schematic view of a conductive polishing pad according to a second embodiment of the present invention.

FIG. 5 shows a schematic view of a conductive polishing pad according to a second embodiment of the present invention. The conductive polishing pad 5 comprises a conductive film 52 (model number: QF400, produced by QUAN YI ELECTRONICS CORP.), a bottom layer 51 and a polishing layer 53. The bottom layer 51 is disposed on the conductive film 52, and comprises a first high polymer 511 and a fiber base 512. The first high polymer 511 covers the fiber base 512, and has a plurality of first holes 513. In the embodiment, the material of the first high polymer 511 is polypropylene (PP), polyethylene terephthalate (PET), polyurethane (PU) or polymeric resin, and the fiber base 512 is a non-woven fabric.

The polishing layer 53 is disposed on the bottom layer 51, and has a polishing surface 531. The polishing layer 53 comprises a second high polymer 532. In the embodiment, the polishing layer 53 is coated on the bottom layer 51, and therefore, the bottom layer 51 and the polishing layer 53 are combined without an adhesive. The second high polymer 532 has a plurality of second holes 533. In the embodiment, the material of the second high polymer 532 is polypropylene (PP), polyethylene terephthalate (PET), polyurethane (PU) or polymeric resin.

In other applications, the conductive polishing pad 5 further comprises a reinforced material (not shown). The reinforced material is disposed in the first holes 513 of the first high polymer 511 and on the surface of the bottom layer 51. The reinforced material is hydrophilic polyurethane, hydrophilic acrylic resin, a water-proofing agent or a softening agent. The hydrophilic polyurethane and the hydrophilic acrylic resin are used to strengthen the bottom layer 51, the water-proofing agent is used to increase water-proofing ability, and the softening agent is used to increase softness. Preferably, the surface resistance of the conductive polishing pad 5 is less than $1\times10^5\Omega$, and the volume resistance of the conductive polishing pad 5 is less than $1\times10^6$ $\Omega\cdot$cm.

Figure 6:
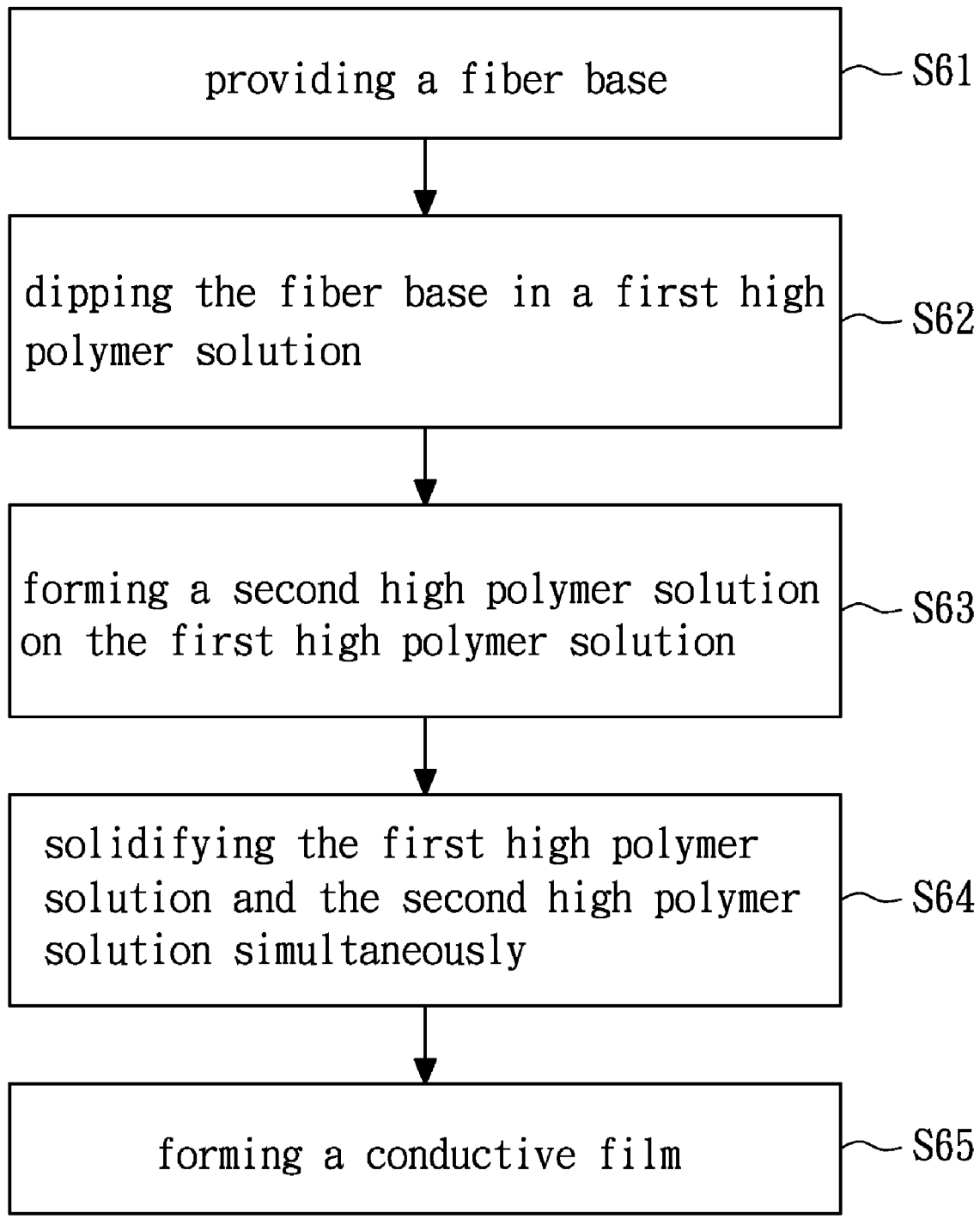
FIG. 6 is a flow chart of a method for making the conductive polishing pad according to the second embodiment of the present invention.

FIG. 6 shows a flow chart of a method for making the conductive polishing pad according to the second embodiment of the present invention. As shown in FIGS. 5 and 6, first, referring to Step S61, a fiber base 512 is provided. In the embodiment, the fiber base 512 is a non-woven fabric. As shown in Step S62, the fiber base 512 is dipped in a first high polymer solution (not shown), so that the fiber base 512 is covered by the first high polymer solution. The first high polymer solution comprises a first high polymer 511 and a first solvent. In the embodiment, the material of the first high polymer 511 is polypropylene (PP), polyethylene terephthalate (PET), polyurethane (PU) or polymeric resin. Preferably, the first high polymer solution further comprises dye, surfactant and dimethylformamide (DMF).

As shown in Step S63, a second high polymer solution (not shown) is formed on the first high polymer solution, and the second high polymer solution comprises a second high polymer 532 and a second solvent. In the embodiment, the second high polymer solution is formed on the first high polymer solution by coating, and the material of the second high polymer 532 is polypropylene (PP), polyethylene terephthalate (PET), polyurethane (PU) or polymeric resin. Preferably, the second high polymer solution further comprises dye, surfactant and dimethylformamide (DMF).

As shown in Step S64, the first high polymer solution and the second high polymer solution are solidified simultaneously, so as to form a bottom layer 51 and a polishing layer 53 respectively. The bottom layer 51 has a plurality of first holes 513, and the polishing layer 53 has a plurality of second holes 533 and a polishing surface 531. In the embodiment, the bottom layer 51 and the polishing layer 53 are combined without an adhesive. In other applications, the method further comprises a step of forming a reinforced material (not shown) in the first holes 513 and on the surface of the bottom layer 51 after Step S64. The reinforced material is hydrophilic polyurethane, hydrophilic acrylic resin, a water-proofing agent or a softening agent, and the reinforced material is formed by dipping. Finally, as shown in Step S65, a conductive film 52 (model number: QF400, produced by QUAN YI ELECTRONICS CORP.) is formed on the bottom layer 51.

Even though the bottom layers 31, 51 and the polishing layers 33, 53 are poor conductors, the conductivity thereof is raised by the conductive films 32, 52, so that the polishing pads 3, 5 have good conductivity. Further, each of the polishing pads 3, 5 has a flexible surface, which prevents a surface of a workpiece to be polished (substrate 42) from being scratched during polishing. Moreover, the polishing pads 3, 5 do not have electrodes, and the polishing surfaces 331, 531 of the polishing pads 3, 5 are uniform material, which prevents materials with different hardness from being worn at different degrees after polishing, and prevents the polishing surfaces 331, 531 from becoming rough. Thus the yield rate is raised.

The following example illustrates the present invention in detail, but the present invention is not limited to the example.

Example

The method of the example corresponds to the first embodiment described above. Referring to FIG. 2, first, as shown, a fiber base 312 is provided. The fiber base 312 is a non-woven fabric. The fiber base 312 is dipped in a first high polymer solution, so that the fiber base 312 is covered by the first high polymer solution. The first high polymer solution comprises 27.8% of the first high polymer by weight, 10% of dye by weight, 0.9% of surfactant by weight and 61.3% of dimethylformamide (DMF) solvent by weight. The material of the first high polymer 311 is polyurethane (PU). Then, the first high polymer solution is solidified, so as to form a bottom layer 31, and the bottom layer 31 has a plurality of first holes 313. A reinforced material is prepared, and the reinforced material comprises 8% of hydrophilic polyurethane by weight and 92% of water by weight. The bottom layer 31 is dipped in the reinforced material, and the reinforced material is formed in the first holes 313 of the bottom layer 31.

Afterward, a conductive film 32 (model number: QF400, produced by QUAN YI ELECTRONICS CORP.) is formed on the bottom layer 31. A second high polymer solution is formed on the conductive film 32. The second high polymer solution comprises 59.4% of the second high polymer 332 by weight, 21.6% of dye by weight, 2.8% of surfactant by weight and 16.2% of dimethylformamide (DMF) solvent by weight. The material of the second high polymer 332 is polyurethane (PU). Finally, the second high polymer solution is solidified, so as to form a polishing layer 33, and the polishing layer 33 has a plurality of second holes 333 and a polishing surface 331.

The first high polymer solution and the second high polymer solution are solidified by the following steps. First, the polymer solution is put in a solidifying liquid, so that part of dimethylformamide (DMF) in the polymer solution goes into the solidifying liquid, and water in the solidifying liquid goes into the polymer solution. Afterward, a washing process is conducted, so as to remove the rest of the dimethylformamide (DMF) in the polymer solution. Finally, the polymer solution is dried at a temperature of 110° C., so as to remove water in the polymer solution, and meanwhile, the polishing pad 3 is formed.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A method for making a conductive polishing pad, comprising the steps of:
    (a) providing a fiber base;
    (b) dipping the fiber base in a first polymer solution, wherein the fiber base is covered by the first polymer solution, and the first polymer solution comprises a first polymer and a first solvent;
    (c) forming a second polymer solution on the first polymer solution, wherein the second polymer solution comprises a second polymer and a second solvent;
    (d) solidifying the first polymer solution and the second polymer solution simultaneously, so as to form a continuous bottom layer and a continuous polishing layer respectively, wherein the bottom layer has a plurality of first holes, and the polishing layer has a plurality of second holes, and the polishing layer is formed on the bottom layer; and
    (e) forming a conductive film on the bottom layer.

2. The method as claimed in claim 1, wherein in Step (a), the fiber base is a non-woven fabric, in Step (b), the first polymer solution further comprises dye, surfactant and dimethylformamide (DMF), the material of the first polymer is polypropylene (PP), polyethylene terephthalate (PET), polyurethane (PU) or polymeric resin, in Step (c), the second polymer solution is formed on the first polymer solution by coating, the second polymer solution further comprises dye, surfactant and dimethylformamide (DMF), the material of the second polymer is polypropylene (PP), polyethylene terephthalate (PET), polyurethane (PU) or polymeric resin, and in Step (d), the bottom layer and the polishing layer are combined without an adhesive.

3. The method as claimed in claim 1, further comprising a step of forming a reinforced material in the first holes of the bottom layer after Step (d), wherein the reinforced material is hydrophilic polyurethane, hydrophilic acrylic resin, a water-proofing agent or a softening agent, and the reinforced material is formed by dipping.

* * * * *